(12) United States Patent
Viberg et al.

(10) Patent No.: US 12,372,420 B2
(45) Date of Patent: Jul. 29, 2025

(54) HIGH-RESISTANCE SENSOR AND METHOD FOR USING SAME

(71) Applicant: ORPYX MEDICAL TECHNOLOGIES INC., Calgary (CA)

(72) Inventors: David Allan Viberg, Calgary (CA); Travis Michael Stevens, Calgary (CA); Michael Todd Purdy, Calgary (CA)

(73) Assignee: ORPYX MEDICAL TECHNOLOGIES INC., Calgary (CA)

(*) Notice: Subject to any disclaimer, the term of this patent is extended or adjusted under 35 U.S.C. 154(b) by 296 days.

(21) Appl. No.: 18/299,148

(22) Filed: Apr. 12, 2023

(65) Prior Publication Data
US 2023/0304874 A1    Sep. 28, 2023

Related U.S. Application Data

(63) Continuation of application No. 17/044,466, filed as application No. PCT/CA2019/050458 on Apr. 15, 2019, now Pat. No. 11,656,135.
(Continued)

(51) Int. Cl.
*G01L 1/22*     (2006.01)
*G01K 5/56*     (2006.01)

(52) U.S. Cl.
CPC . *G01L 1/22* (2013.01); *G01K 5/56* (2013.01)

(58) Field of Classification Search
CPC ... G01L 1/205; G01L 1/16; G01L 1/22; G01L 1/02; G01L 19/0627; G01L 1/18;
(Continued)

(56) References Cited

U.S. PATENT DOCUMENTS

| 4,745,930 | A | * | 5/1988 | Confer | A43B 17/00 |
| | | | | | 600/595 |
| 5,033,291 | A | * | 7/1991 | Podoloff | G01L 1/205 |
| | | | | | 73/172 |

(Continued)

FOREIGN PATENT DOCUMENTS

| JP | S58133642 U | 9/1983 |
| JP | S62240827 A | 10/1987 |

(Continued)

OTHER PUBLICATIONS

Extended European Search Report issued on Nov. 25, 2021 in European application No. 19789341.5.
(Continued)

*Primary Examiner* — Brandi N Hopkins
(74) *Attorney, Agent, or Firm* — ABM INTELLECTUAL PROPERTY INC.; Adrienne Bieber McNeil

(57) ABSTRACT

A high-resistance sensor. The sensor includes a first low-resistance material and a second low-resistance material, each connected with a base material. The first low-resistance material and the second low-resistance material are separated by a gap. A stimulus causes the first low-resistance material and the second low-resistance to move toward each other. A high-resistance material is positioned within the gap intermediate the first low-resistance material and the second low-resistance material. The high-resistance material increases the resistance of a circuit formed by contact between the first low-resistance material and the second low-resistance material when the sensor is subject to the stimulus.

20 Claims, 18 Drawing Sheets

Related U.S. Application Data

(60) Provisional application No. 62/658,403, filed on Apr. 16, 2018.

(58) Field of Classification Search
CPC ......... G01L 1/14; G01L 9/0073; G06F 1/163; G06F 3/04146; G01B 7/20; G01B 7/18; G01K 5/56
See application file for complete search history.

(56) References Cited

U.S. PATENT DOCUMENTS

| | | | |
|---|---|---|---|
| 5,948,990 | A | 9/1999 | Hashida |
| 6,339,962 | B1 | 1/2002 | Scheuter et al. |
| 6,373,373 | B1 | 4/2002 | Saito |
| 8,698,777 | B2 | 4/2014 | Endo et al. |
| 8,739,639 | B2 | 6/2014 | Owings et al. |
| 9,549,585 | B2 * | 1/2017 | Amos ................. G01C 22/006 |
| 2012/0090408 | A1 | 4/2012 | Jheng et al. |
| 2013/0133435 | A1 | 5/2013 | Muramatsu et al. |
| 2014/0321196 | A1 | 10/2014 | Ikeda et al. |
| 2016/0195440 | A1 | 7/2016 | Amos et al. |
| 2016/0287089 | A1 | 10/2016 | Yi et al. |
| 2016/0345083 | A1 | 11/2016 | Pinkerton et al. |
| 2017/0104018 | A1 | 4/2017 | Yamazaki et al. |
| 2018/0292279 | A1 | 10/2018 | Chen et al. |

FOREIGN PATENT DOCUMENTS

| | | |
|---|---|---|
| JP | H1078357 A | 3/1998 |
| JP | 2000088670 A | 3/2000 |
| JP | 2001021423 A | 1/2001 |
| JP | 2001066371 A | 3/2001 |
| JP | 2001165788 A | 6/2001 |
| JP | 2008224334 A | 9/2008 |
| JP | 2008304558 A | 12/2008 |
| JP | 2011076172 A | 4/2011 |
| JP | 5567735 B1 | 8/2014 |
| JP | 5928859 B1 | 6/2016 |
| WO | 2013126751 A1 | 8/2013 |
| WO | 2014119658 A1 | 8/2014 |
| WO | 2016102689 A1 | 6/2016 |
| WO | 2019161511 A1 | 8/2019 |

OTHER PUBLICATIONS

Final Office Action Issued in U.S. Appl. No. 17/044,466 on Nov. 17, 2022.

International Search Report, Search Strategy, and Written Opinion of the International Searching Authority in International Application No. PCT/CA2019/050458, mailed Jul. 4, 2019.

Notice of Allowability Issued on Feb. 22, 2022 in U.S. Appl. No. 17/044,466.

Notice of Allowance Issued on Jan. 30, 2023 in U.S. Appl. No. 17/044,466.

Office Action Issued in Japanese Patent Application No. 2020-556317 on Jan. 20, 2023, with translation.

Office Action issued on Aug. 17, 2022 in Japanese patent application No. 2020-556317, with translation.

Office Action Issued on Aug. 22, 2022 in U.S. Appl. No. 17/044,466.

* cited by examiner

HIGH-RESISTANCE SENSOR AND METHOD FOR USING SAME

CROSS-REFERENCES TO RELATED APPLICATIONS

This application is a continuation of U.S. patent application Ser. No. 17/044,466 having a 371(c) date of Oct. 1, 2020, which a national stage entry of International Patent Application No. PCT/CA2019/050458 filed on Apr. 15, 2019, which claims priority from U.S. Provisional Patent Application No. 62/658,403 filed on Apr. 16, 2018.

FIELD

The present disclosure relates to a high-resistance sensor and a method of using the sensor.

BACKGROUND

Sensors that measure applied force have a multitude of uses. A force-sensitive sensor may be used in systems for measurement of pressure on an individual, such as in a shoe or a on a hospital mattress. Many such force sensor systems measure changes in electrical characteristics, such as resistance, of the sensor upon application of the force.

SUMMARY

Herein provided is a high-resistance sensor. The sensor includes separate conductors or other low-resistance material separated by a gap. A first high-resistance material is positioned within the gap intermediate the separate low-resistance materials. When a stimulus is applied to the sensor, the low-resistance materials each contact the high-resistance material, forming a circuit that includes the high-resistance material. The stimulus may be a force, in which case a base material on which the high-resistance materials are bonded or otherwise affixed may flex, directing the low-resistance materials into the gap and forming a circuit including the high-resistance material and both low-resistance materials. In other cases, the stimulus may be temperature or any other suitable input that may drive the low-resistance materials and any base material to flex or otherwise move toward each other. Including the high-resistance material may provide advantages in terms of power efficiency of the sensor, resolution, and accuracy.

In a first aspect, herein provided is a high-resistance sensor. The sensor includes a first low-resistance material and a second low-resistance material, each connected with a base material. The first low-resistance material and the second low-resistance material are separated by a gap. A stimulus causes the first low-resistance material and the second low-resistance to move toward each other. A high-resistance material is positioned within the gap intermediate the first low-resistance material and the second low-resistance material. The high-resistance material increases the resistance of a circuit formed by contact between the first low-resistance material and the second low-resistance material when the sensor is subject to the stimulus.

In a further aspect, herein provided is a sensor including: a first base material; a second base material; a first low-resistance material connected with the second base material; a second low-resistance material connected with the second base material and separated from the first low-resistance material by a gap for flexing toward low-resistance material under a stimulus; and a first high-resistance material positioned within the gap intermediate the first low-resistance material and the second low-resistance material for increasing the resistance of a circuit formed by the first low-resistance material and the second low-resistance material when the sensor is subjected to the stimulus.

In some embodiments, the first base material is flexible and the stimulus includes force.

In some embodiments, the first base material is deformable in response to changes in temperature and the stimulus includes a change in temperature.

In some embodiments, the first low-resistance material is connected with the first base material in a first pattern; the second low-resistance material is connected with the second base material in a second pattern; and the first pattern and the second pattern do not overlap.

In some embodiments, the gap is filled with a fluid.

In some embodiments, the gap is vacuum sealed. In some embodiments, the stimulus is tension.

In some embodiments, the first high-resistance material is bonded with the first low-resistance material.

In some embodiments, the sensor further includes a second high-resistance material. In some embodiments, the first high-resistance material and the second high-resistance material are in constant contact and the gap is substantially minimal. In some embodiments, the circuit is formed by contact between the first high-resistance material and the second high-resistance material.

In some embodiments, the sensor further includes a protective material for reducing permeation of fluids into the sensor.

In some embodiments, the sensor further includes a material adjacent the first base material for directing the stimulus.

In some embodiments, the first high-resistance material is located within the gap and the gap is defined both between the first high-resistance material and the first low-resistance material.

In a further aspect, herein provided is a method of sensing a stimulus including: providing a first low-resistance material separated from a second low-resistance material by a gap; providing a first high-resistance material intermediate the first low-resistance material and the second low-resistance material within the gap; applying a stimulus to the first low-resistance material and the second low-resistance material for closing the gap between the first low-resistance material and the second low-resistance material to create a circuit including the first low-resistance material, the second low-resistance material and the first high-resistance material; and measuring a change in electrical properties of the circuit as a result of the stimulus.

In some embodiments, the stimulus includes force.

In some embodiments, the stimulus includes a change in temperature.

In some embodiments, the method further includes a second high-resistance material where the first high-resistance material and the second high-resistance material are in constant contact and the gap is substantially minimal.

In some embodiments, the method further includes a protective layer.

In some embodiments, the method further includes a base material bonded to the first high-resistance material and includes a material adjacent to the base material for directing the stimulus.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached figures, in which reference numerals sharing a common final two digits refer to corresponding features across figures (e.g. the sensor 20, 120, 220, 320, 420, 520, etc.).

DETAILED DESCRIPTION

Figure 1:
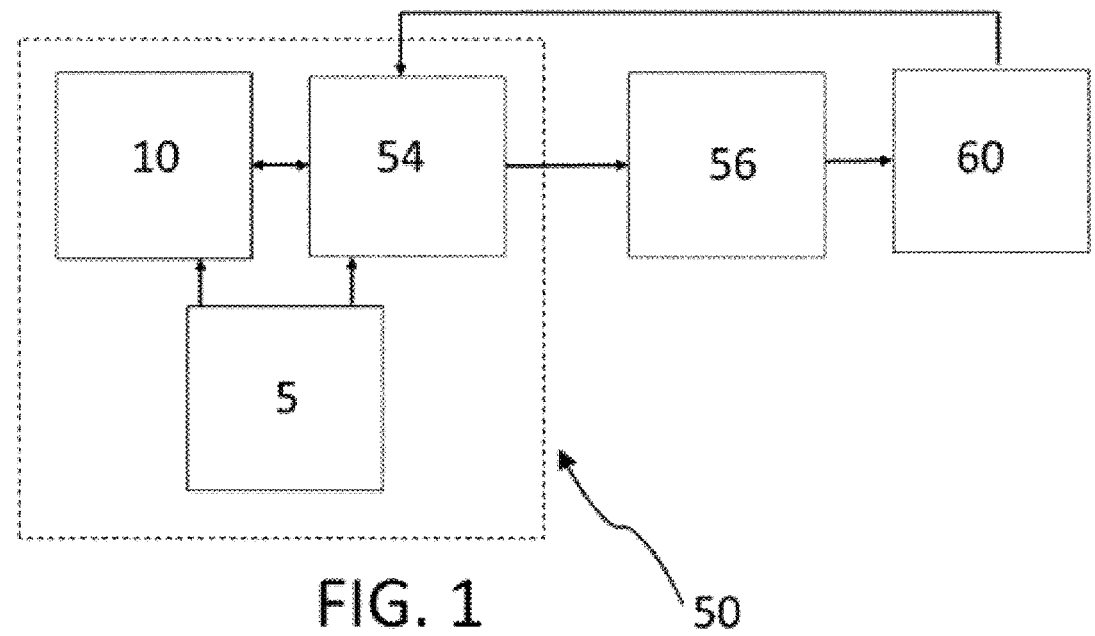
FIG. 1 is a block diagram view of a detection system in accordance with an embodiment of the present disclosure.

Generally, the present disclosure provides a high-resistance sensor. A combination of high-resistance and low-resistance materials provide a path through which electrical current may flow upon application of an external stimulus to the sensor. The sensor may detect changes in an electrical property of material in the sensor (e.g. resistance, conductance, capacitance, inductance, etc.).

Previous systems for measuring changes in force, and the signals provided by such systems, may be affected by electrical resistance of traces that define electrical leads in the system. Differences between trace resistances at different portions of the sensor, or differences from one reading to the next, may result in measurable changes to the resistance of the electrical circuit material. Changes to the trace resistances may result in calibration drift and corresponding changes to the signal detected by the sensor. Previous systems including only low-resistance sensors may drain more electrical current than a system that incorporates a high-resistance sensor. In addition to consuming more power, systems requiring a larger current draw may be subjected to more noticeable cross-channel effects, which may also result in errors in reported measurements. Cross-channel effects may result in signal noise from inductive and capacitive events occurring between nearby conducting traces. Cross-channel effects may result in errors in reported measurements.

Herein provided is a high-resistance sensor including two conductive layers separated by a gap. The two conductive layers may be urged into contact with each other under applied force or may be urged into more intimate contact if already in contact. Each of the conductive layers includes a low-resistance material (e.g. copper, silver, gold, copper, conductive ink, etc.) and an insulating base material. A first layer includes a first base material and a first low-resistance material. A second layer includes a second base material and a second low-resistance material. The first base material may be made of a different material than the second base material. The first low-resistance material may be made of a different material than the second low-resistance. A high-resistance material (e.g. conductive materials, semi-conductive materials, piezoelectric materials, piezoresistive materials, force-sensing materials, force-sensing resistors, force-resistive inks, etc.) is positioned between the two low-resistance materials. The low-resistance material may be traced on, bonded to or otherwise connected with the base material. The high-resistance material may be held in place by friction, traced on, bonded to or otherwise connected to the low-resistance material and/or the base material. Under applied force, the two low-resistance materials are urged toward each other, and the high-resistance material between the two low-resistance materials provides a high-resistance path for a signal resulting in electrical communication between the two conductive layers.

The low-resistance material may be traced, applied or otherwise patterned on each of the two insulating base material layers in an offset pattern such that overlapping portions of the layers lacking any low-resistance material are defined. Void spaces that lack low-resistance material over a portion of the sensor across both of the conductive layers force flow of current between the low-resistance material on the two conductive layers to be directed through the high-resistance material when the two conductive layers are forced into contact with each other.

The high-resistance material in the circuit between the first and second low-resistance materials of the sensor may mitigate the effects on sensor signal of stray impedances and changes in lead resistance. Mitigating these effects may increase sensitivity of the sensor to changes in resistance or other electrical properties of a circuit including both low-resistance materials. The high-resistance sensors may also mitigate sensor hysteresis and increase resolution of the sensor across a range of applied forces.

FIG. 1 shows a block diagram of a detection system 50 where the detection system includes a sensor system 10 and transmission module 54 powered by a power source 5. The sensor system 10 is in electronic communication with the transmission module 54 and the transmission module 54 transmits data 56 to a computing device 60. The computing device 60 processes the data 56, which may then be displayed, communicated to a user, stored and optionally fed back to the transmission module 54. The transmission device may transmit the data 56 via cables or wirelessly to the computing device 60. The power source 5 may be a battery that powers the sensor system 10 and the transmission module 54. The power source 5 may be a battery that powers the sensor system 10 and the transmission module 54. Current from the power source 5 may be sent through the sensor system 10 and the resulting output current can be read to determine a resistance from an associated stimulus change for example, such as described in international patent application PCT/CA2019/050229 to Viberg et al.

Figure 2:
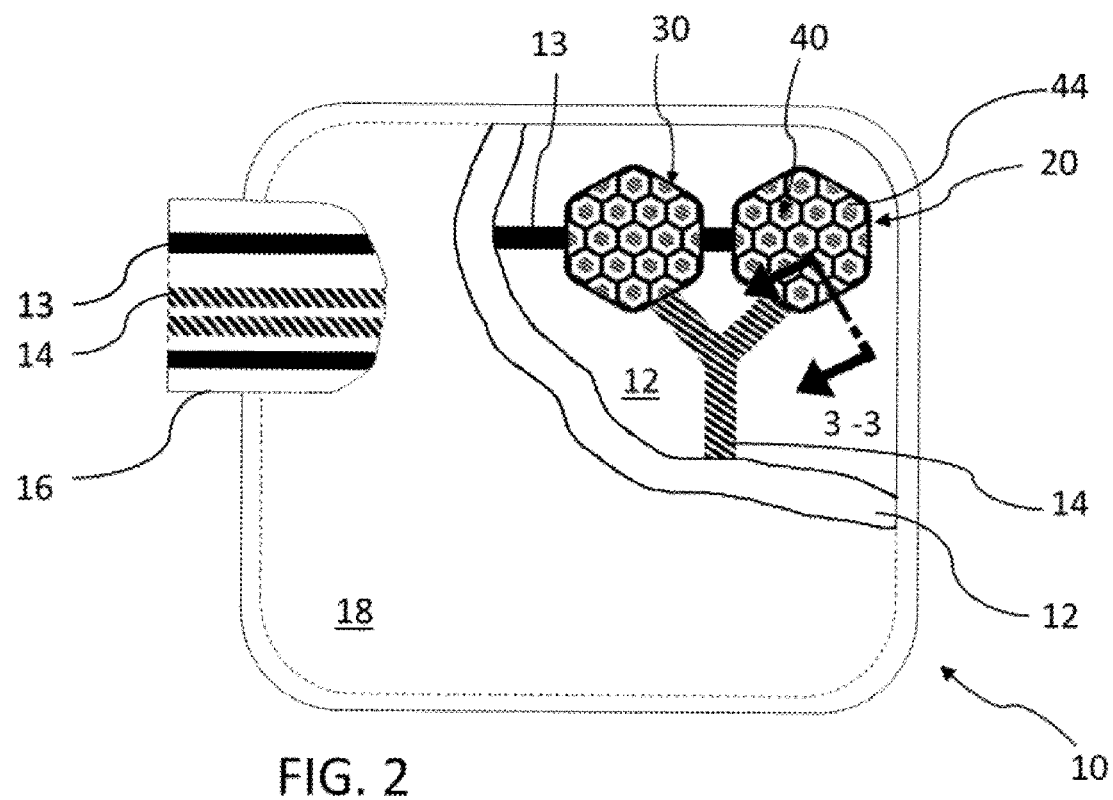
FIG. 2. is a schematic cutaway view of a sensor package in accordance with an embodiment of the present disclosure.

FIG. 2 shows a sensor system 10 including a first layer 30 and a second layer 40 with the first high-resistance material, the second high-resistance material and spacer are not shown. The sensor system 10 includes a plurality of sensors 20 disposed on a base material 12. The base material 12 may be manufactured from any suitable flexible insulating material (e.g. polyethylene terephthalate glycol modified, polyimide, polyester, etc.) or any other dimensionally stable, printable electrical insulating material that can bend and deform upon application of force or other stimulus. The sensors 20 are connected with each other by first traces 13 and second traces 14. The first traces 13 and the second traces 14 may be prepared from low-resistance material (e.g. copper, silver, gold, copper, conductive ink, temperature resistive ink, etc.). The sensors 20 may be disposed in an array that allows for individual addressing using a row and column addressing scheme (not shown) or they may be configured in parallel within the sensor system 10. FIG. 2 shows a 2 by 1 array of sensors 20 under the layers of base material 12 and protective material 18. The sensors 20 are connected in the first layer in a row via first trace 13 and in a column in the second layer via a 'Y' shaped second trace 14. The first traces 13 and the second traces 14 are connected with an output interface 16 for providing data externally to the sensor system 10. A protective material 18 may be applied to the base material 12 for protecting the base material 12, the first high-resistance material (not shown), the second high-resistance material (not shown), the spacers (not shown), the sensors 20, the first traces 13 and the second traces 14. The protective material 18 may be applied to one or both surfaces of the sensor system 10. The protective material 18 may encompass the entire sensor system 10 or a portion thereof. The protective material 18 may be constructed of metal such as aluminum or any other suitable material that reduces the permeation of gases and/or fluids to and from the sensor system 10. The protective material 18 may be foil laminated or foil applied by evaporated deposition and the sensor system 10 may be vacuumed before sealing. The protective material 18 may alternately be manufactured of carbon fiber or Kevlar® or any material for protecting the sensors from damage due to excessive high pressure, creasing, bending.

Figure 3:
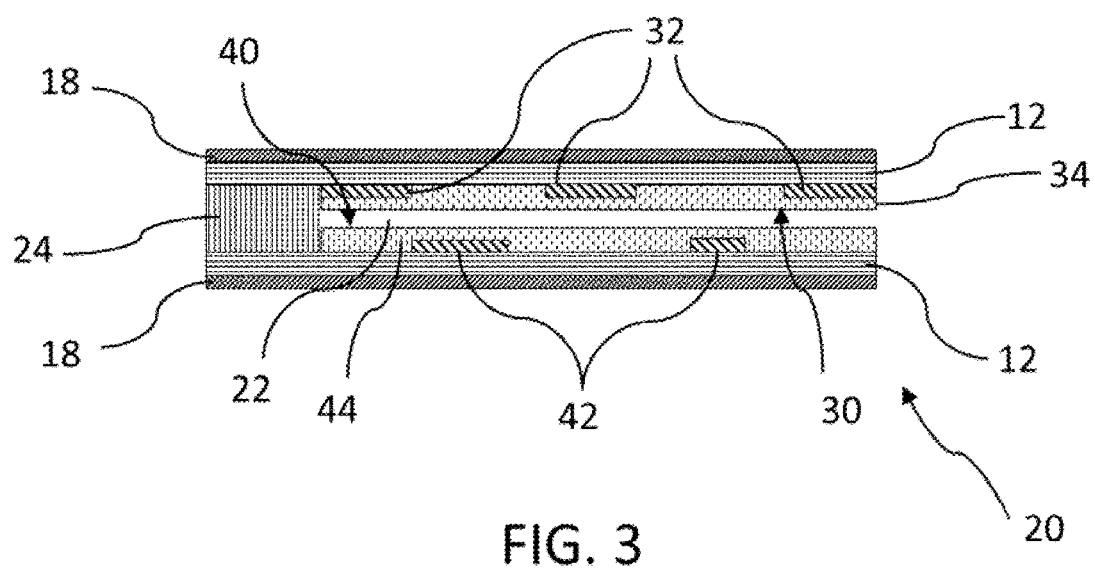
FIG. 3 is a schematic cross-sectional view of the sensor of FIG. 2 along the line 3-3.

FIG. 3 shows a cross-sectional view of a sensor 20 along the axis 3-3 of FIG. 2. FIG. 3 shows the first high resistance material 34 (not shown in FIG. 2), the second high resistance layer 44 (not shown in FIG. 2) and the spacer 24 (not shown in FIG. 2) on the periphery of the sensor 20. FIG. 3 shows the first layer 30 including the base material 12 and the first low-resistance material 32 with a connected first high-resistance material 34. The second layer 40 includes the base material 12 and the second low-resistance material 42 and it has a connected second high-resistance material 44. The spacer 24 on the periphery of the sensor 20 is disposed between the two layers of base material 12. There is a gap 22 between the first high resistance material 34 and the second high-resistance material 44. The protective material 18 protects the outer layers of base material 12. In this embodiment, the first low-resistance materials 32 and the second low-resistance materials 42 do not overlap in the vertical plane of the sensor 20.

Figure 4:
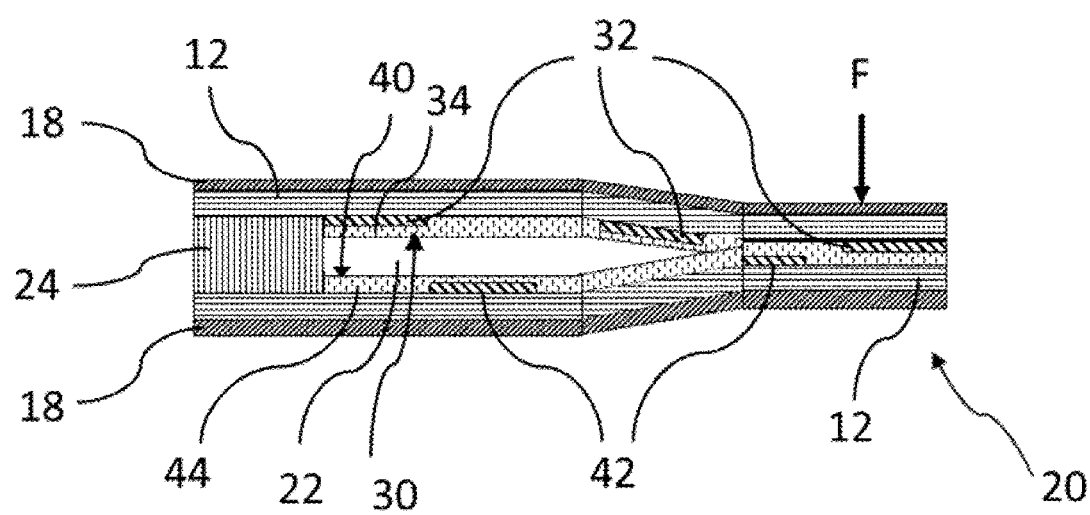
FIG. 4 is the cross-sectional view of the sensor of FIG. 2 along the axis 3-3 and during exposure to pressure.

In FIG. 4, the sensor 20 of FIG. 3 has been subjected to a force F, placing the first high-resistance material 34 in contact with the second high-resistance material 44, closing a circuit and generating a signal to be output at the output interface 16 (see FIG. 2). A similar effect may result from the urging of the first layer toward the second layer due to dimensional changes effected by a change in temperature. For example, an increase in temperature may cause a differential expansion of the elements of the sensor system 10, which may lead to deformation of the sensor system 10 (the low-resistance material used in the low resistance trace may expand more than other materials in the sensor system 10). The protective material 18 may surround the sensor system 10 on both sides, isolating the sensor 20 and the base material 12 from the external environment, or may be on one side only of the sensor package 10. Each sensor 20 includes a first layer 30 and a second layer 40. Both the first layer 30 and the second layer 40 include the base material 12. The first layer 30 is in electrical communication with the first traces 13 and the second layer 40 is in electrical communication with the second traces 14. The first layer 30 is separated from the second layer 40 by a gap 22. The gap 22 may be filled with air and open to the atmosphere, or may be a closed environment including a fluid (e.g. air, nitrogen, gas, water, oil, gel, etc.) or any other compressible substance (e.g. foam, etc.).

The gap 22 is maintained by a spacer 24. The spacer 24 may be a dielectric or another insulating material to prevent electrical contact between the first layer 30 and the second layer 40. The spacer 24 may also include adhesive material to bond the base material to the second layer of base material or any adhesive material used to bond any of the layer elements to each other. The spacer 24 prevents the first layer 30 from coming into contact with the second layer 40 when the sensor system 10 is not subjected to an applied force, a temperature change or other effect that urges the first layer 30 toward the second layer 40. Upon application of a force, temperature change or other effect to the sensor system 10, the first layer 30 and the second layer 40 flex toward each other. When the first layer 30 and the second layer 40 flex toward each other sufficiently to come into contact across the gap 22, then a circuit including the first layer 30 and the second layer 40 is completed. As a result, upon application of force or another stimulus to the sensor 20, the first layer 30 may come into contact with the second layer 40 through the gap 22, and changes the electrical characteristics of the sensor 20 for generating a signal.

The first layer 30 includes a first low-resistance material 32 and a first high-resistance material 34. The second layer 40 includes a second low-resistance material 42 and a second high-resistance material 44. The first low-resistance material 32 is patterned on the base material 12 such that first low-resistance material 32 does not overlap with the second low-resistance material 42. The first low-resistance material 32 and the second low-resistance material 42 may be any suitable low-resistance material (e.g. copper, silver, gold, copper, conductive ink, etc.). The first high-resistance material 34 and the second high-resistive material 44 may include any suitable conductive material that has a higher resistance than each of the first low-resistance material 32 and the second low-resistance material 42 (e.g. piezoelectric materials, piezoresistive materials, force-sensing materials, force-sensing resistors, force-resistive inks, etc.).

Figure 5:
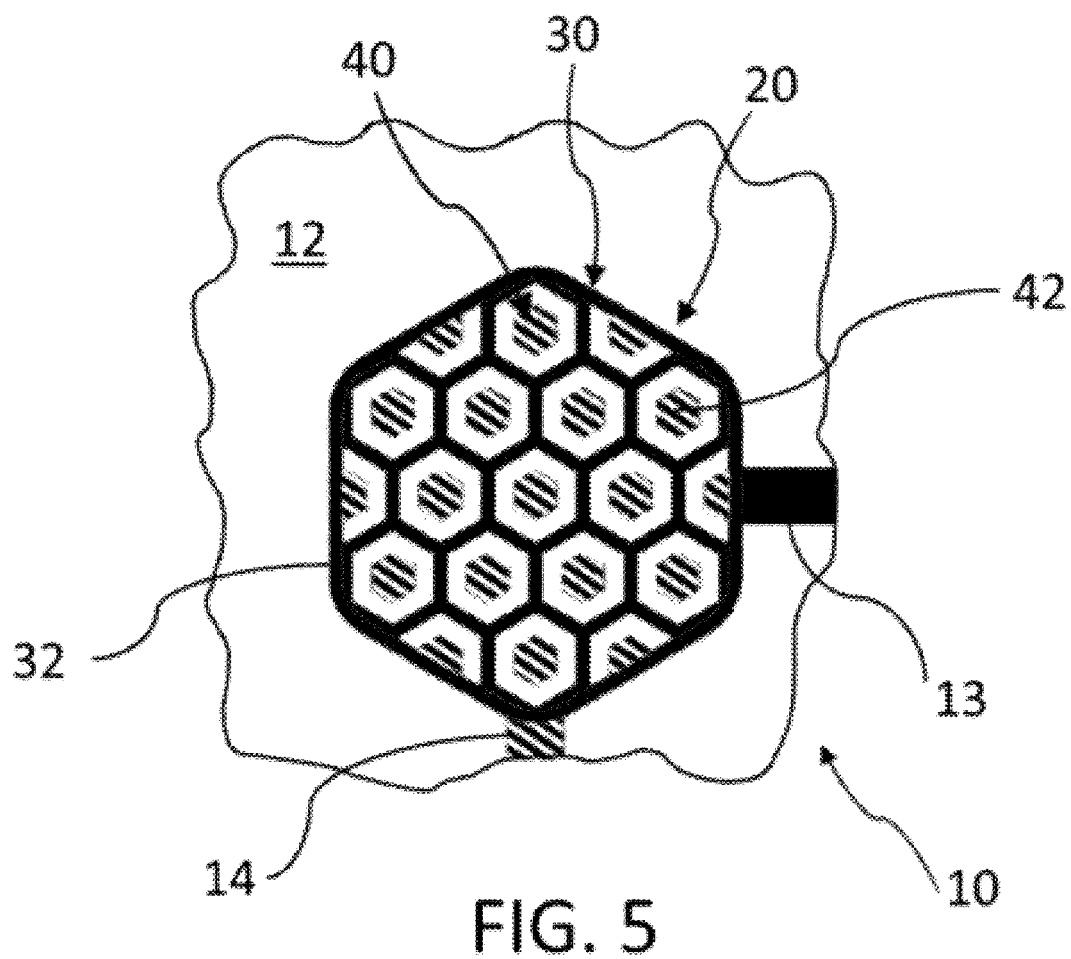
FIG. 5 is a schematic cutaway plan view of a sensor in the sensor package of FIG. 1.

FIG. 5 shows the sensor 20 of the sensor system 10 with the first high-resistance material 34 and the second high-resistance material 44 removed for the purpose of illustrating the offset nature of the conductive layers. This figure shows an increased resistance sensor 20 where the non-overlap of the low-resistance conductive layers creates an even higher resistance between opposing first layer 30 and second layer 40. This design urges the current to flow vertically through the first layer 30, laterally through the high-resistance material (not shown) and then vertically through the second layer 40, which is a more resistive path than a path flowing vertically through sensor 20. The honeycomb configuration is an example of the offset pattern of the first low-resistance material 32 of the first layer 30 shown in black hexagon outlines. The first low-resistance material 32 is connected to the first trace 13. The second low-resistance material 42 of the second layer 40 is show in striped hexagon shapes and is connected to the second trace 14. The white area in between the hexagon shapes and the hexagon outlines is the offset pattern formed by the low-resistance materials. The high-resistance material (not shown) is disposed in between the first layer 30 and the second layer 40.

Figure 6:
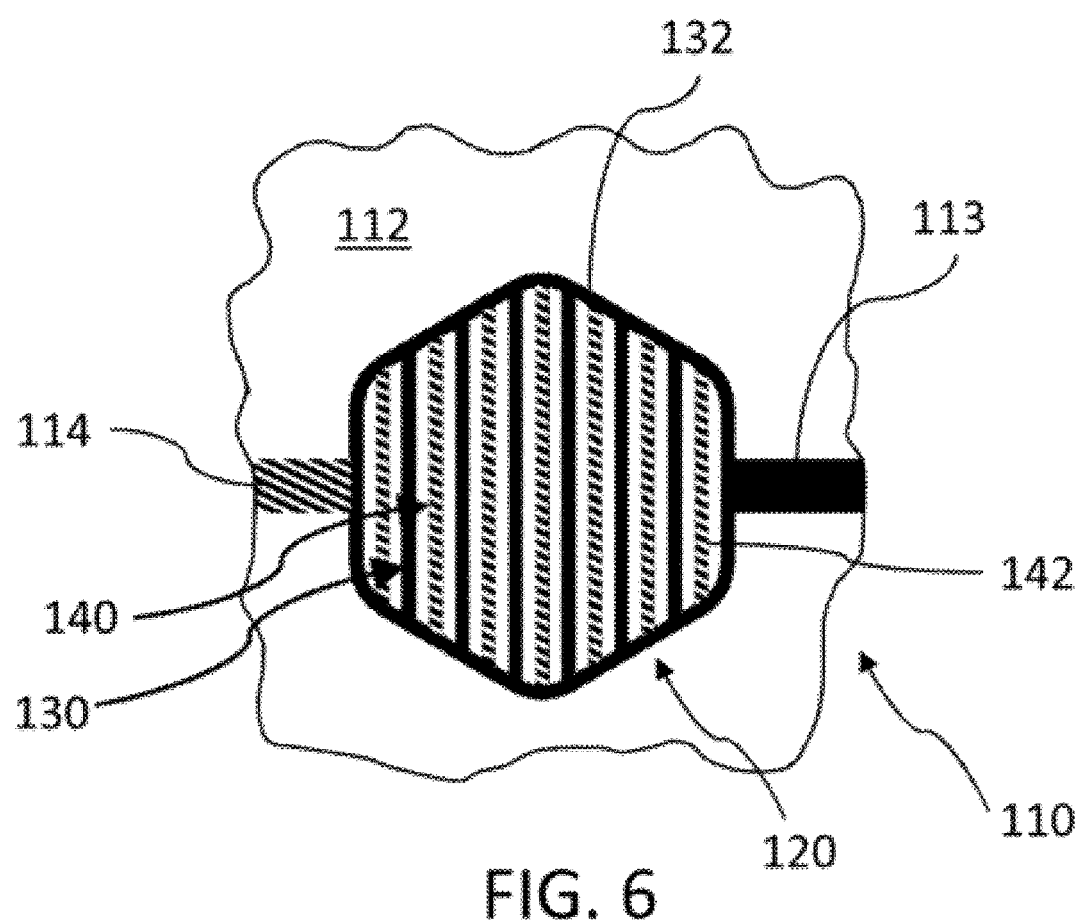
FIG. 6 is a schematic cutaway plan view of a sensor in accordance with an embodiment of the present disclosure.

FIG. 6 shows a top cutaway view of another embodiment of a sensor 120 in accordance with the present disclosure. For clarity purposes, FIG. 6 does not show the high-resistance material. In this embodiment, the sensor 120 includes the first layer 130 and the second layer 140 distributed on the base material 112. The first layer 130 and the second layer 140 have a different tracing pattern than the first layer 30 and the second layer 40 of the sensor 20 of FIG. 5. The low-resistance material of the first layer 130 and the second layer 140 are offset in an alternating striped pattern. The first low-resistance material 132 is connected to the first trace 113 and the second low-resistance material 142 is connected to the second trace 114. The white area in between the stripes formed by low-resistive material is the offset of the trace patterns. Similarly to the sensor 20, upon application of pressure, temperature change or other suitable stimulus, the first layer 130 contacts the second layer 140 to form a circuit. The circuit also includes one or more high-resistance layers (not shown).

Figure 7:
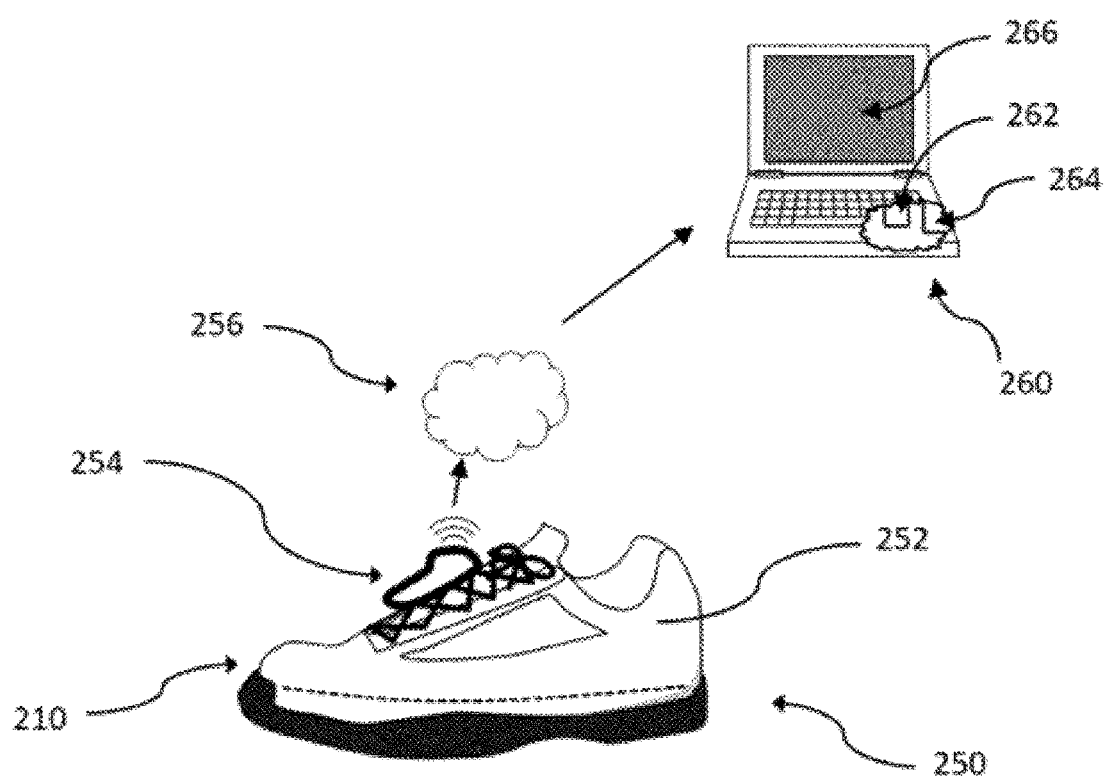
FIG. 7 is a schematic view of a system for measuring pressure on plantar surfaces of an individual's feet in accordance with an embodiment of the present disclosure.

FIG. 7 shows an embodiment of a schematic of a footfall detection system 250 in accordance with the present disclosure. The footfall detection system 250 includes a sensor system 210 in a shoe 252. The sensor system 210 may be included over, under or within an insole, orthotic or other insert, affixed temporarily or permanently to the shoe 252 or otherwise integrated into the footfall detection system 250. The sensor system 210 may alternately be located outside of footware and be arranged on the floor or integrated into a mat in other footfall detection systems 250. The sensor system 210 is in electronic communication with a transmission module 254. The sensor system 210 and the transmission module 254 are powered by a power source (205 in FIG. 8). The transmission module 254 transmits data 256 to a computing device 260 (e.g. laptop computer, smart watch, smartphone, tablet, cloud-based server, etc.). The computing device 260 includes a processing module 262 for processing the data 256. Processed data may be displayed or otherwise communicated to a user via a communication module 266, stored in a storage module 264 or both.

Figure 8:
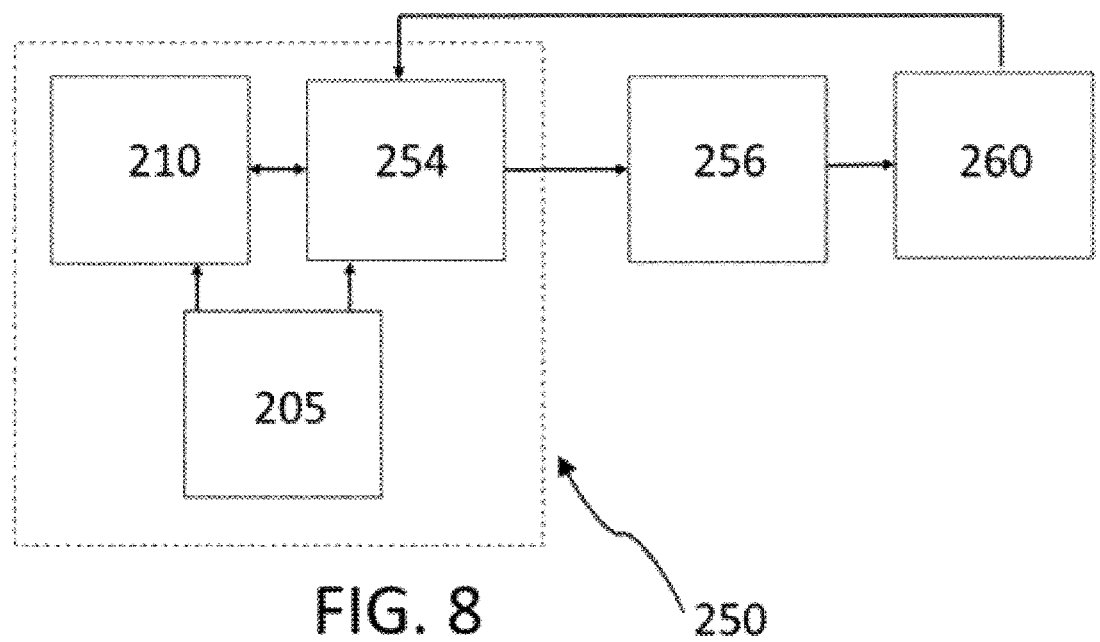
FIG. 8 is a block diagram of the system of FIG. 7.

FIG. 8 shows a block diagram of the footfall detection system 250 of FIG. 7. The footfall detection system 250 includes a sensor system 210 and transmission module 254 powered by the power source 205. The sensor system 210 is in electronic communication with the transmission module 254 and the transmission module 254 transmits data 256 to a computing device 260 (e.g. laptop computer, smart watch, smartphone, tablet, cloud-based server, etc.). The computing device 260 processes the data 256 which may then be displayed or otherwise communicated to a user, stored and optionally fed back to the transmission module 254 for calibration.

Figure 9:
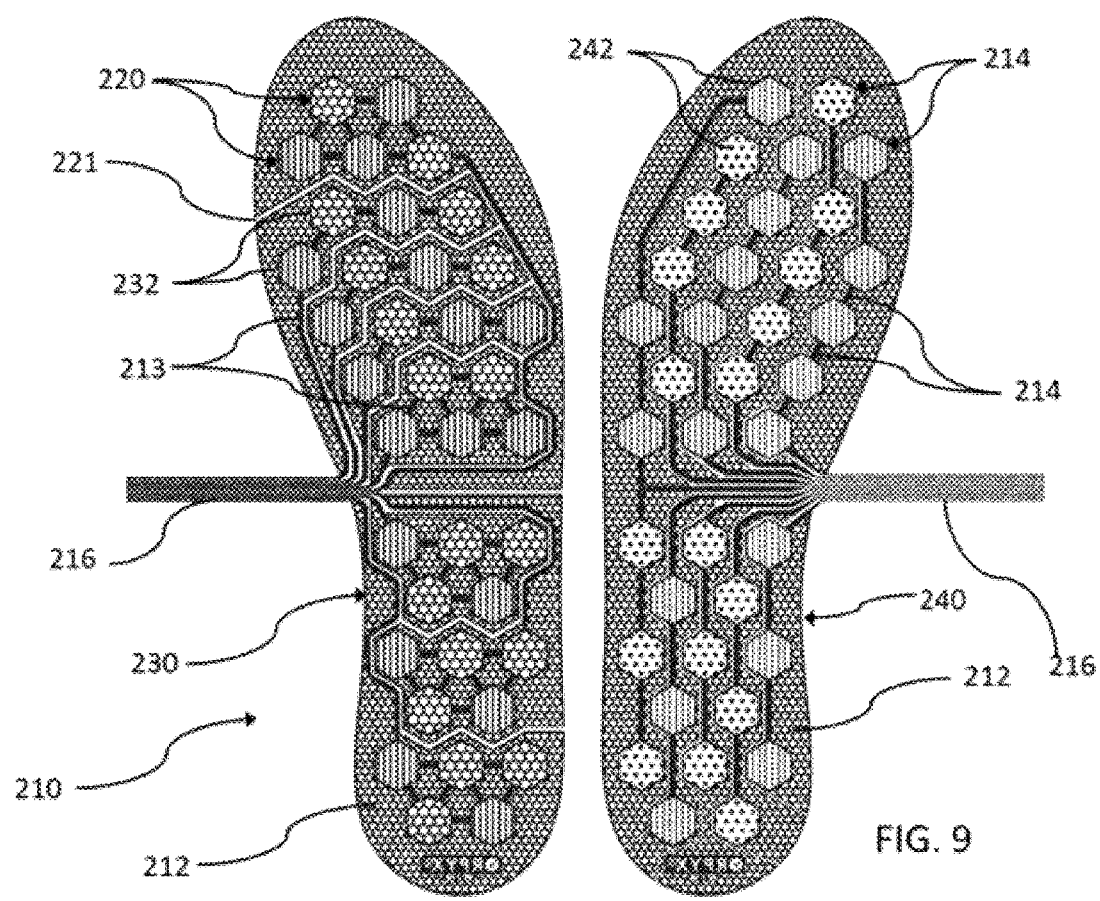
FIG. 9 is a schematic view of a sensor package included in the system of FIG. 7.

FIG. 9 shows a plan view of the first layer 230 and of the second layer 240 of the sensor system 210 laid open with the high-resistance material removed. The outline of layers 230 and 240 are mirror images of a foot outline. The base material 212 is visible for both the first layer 230 and the second layer 240. The sensors 220 are shown in an array of two pattern variations for the first low-resistance material 232 and similarly for the second low-resistance material 242. Some of the sensors 220 follow the pattern of sensor 20 of FIG. 5, while others follow the pattern of sensor 120 of FIG. 6. To operate this sensor system 210, the first layer 230 and the second layer 140 are sandwiched with a layer of high-resistance material (not shown). The low-resistance material traces of the first layer 230 are connected with the first leads 213 and the low-resistance material traces of the second layer 240 are connected to the second leads 214. The black lines of FIG. 9 show the electrical traces and the white areas 221 show breaks in electrical connectivity. Both traces 213 and 214 are connected with the output interface 216. Sensors 220 are clustered together in groups according to a "row" on one side and to a "column" on the other side of the foot arrays. In this way, no two sensors are connected to the same row and column and it is possible to fully isolate one sensor from the others by applying current to a row and reading the resistance measurement on a column. This increases resolution across the entire sensor system 620; each sensor can measure pressure at a specific location, while remaining electrically isolated from all other sensors so that their resistance does not affect the reading at the sensor of interest.

Figure 10:
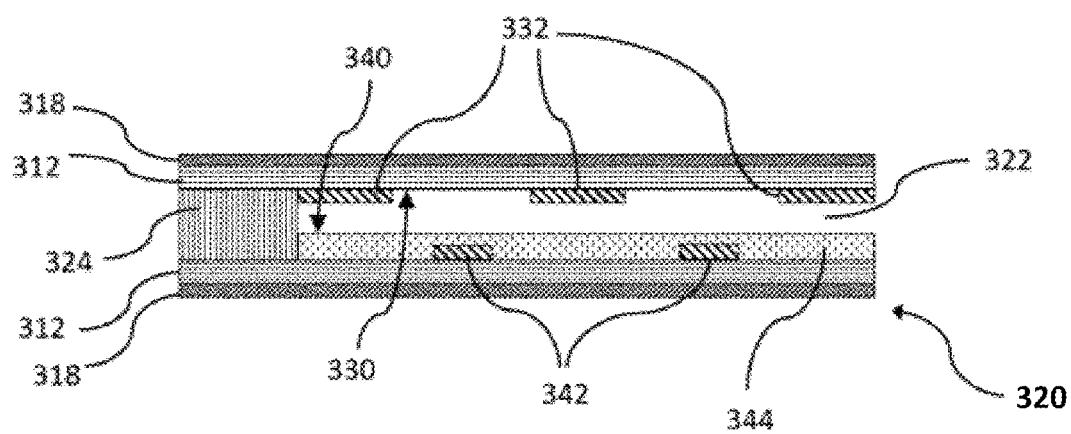
FIG. 10 is a schematic cross-sectional view of a sensor in accordance with an embodiment of the present disclosure.

FIG. 10 shows a cross sectional view of another embodiment of a sensor in accordance with the present disclosure. In sensor 320, the second high-resistance material 344 is provided and no first high-resistance material is provided.

Figure 11:
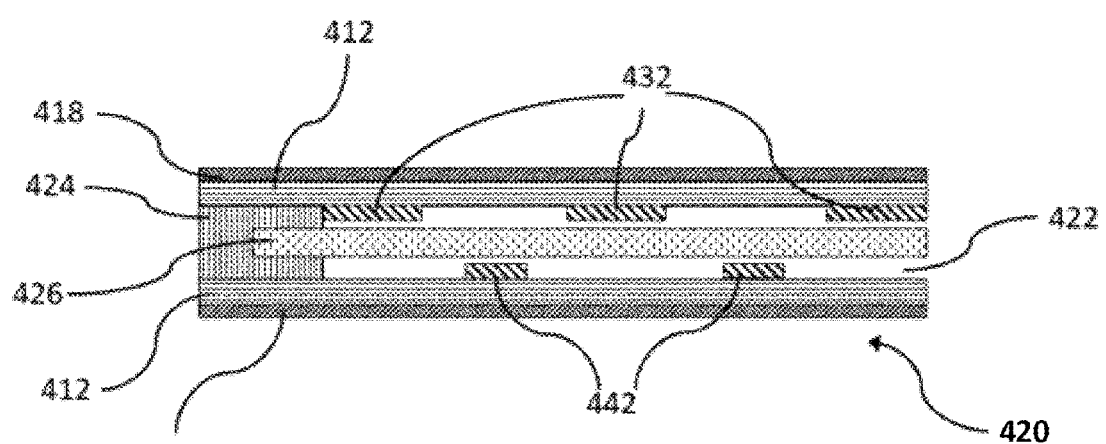
FIG. 11 is a schematic cross-sectional view of a sensor in accordance with an embodiment of the present disclosure.

FIG. 11 shows a cross sectional view of another embodiment of a sensor in accordance with the present disclosure. In the sensor 420, there is no high-resistance material bonded to either the first layer 430 or the second layer 440. The high-resistance material is provided by a separate high-resistance member 426 positioned between the first layer 430 and the second layer 440.

Figure 12:
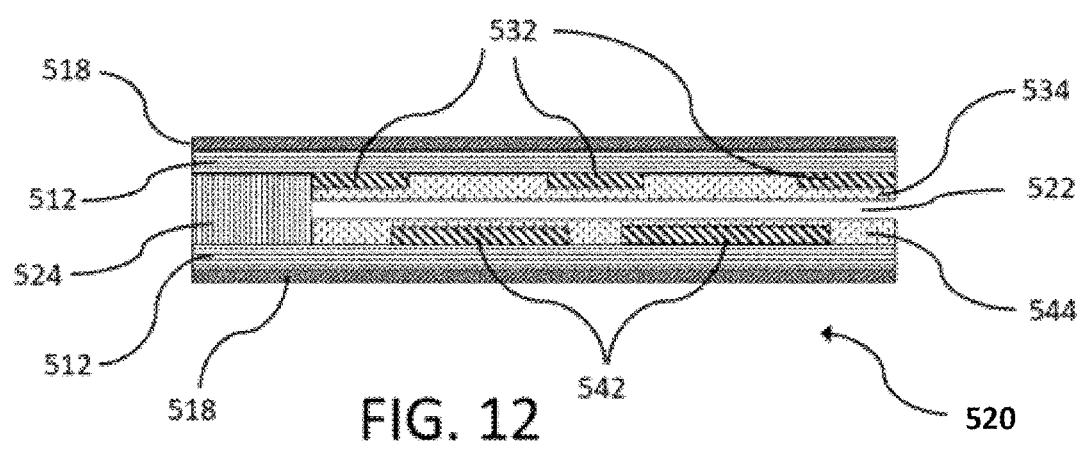
FIG. 12 is a schematic cross-sectional view of a sensor in accordance with an embodiment of the present disclosure.

FIG. 12 shows a cross sectional view of another embodiment of a sensor in accordance with the present disclosure. In the sensor 520, the pattern of low-resistance material 532 and the low-resistance material 544 is such that the low-resistance material 532 and the low-resistance material 544 overlap with each other. This sensor arrangement can be used for the detection of pressure via thresholds of higher and lower resistivity paths.

Figure 13:
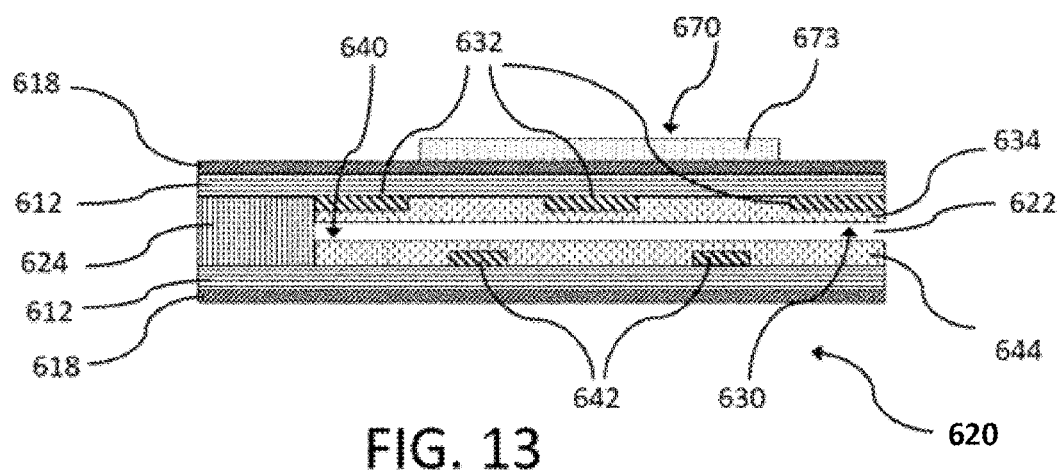
FIG. 13 is a schematic cross-sectional view of a sensor in accordance with an embodiment of the present disclosure.

FIG. 13 shows a cross sectional view of another embodiment of a sensor in accordance with the present disclosure. The sensor 620 includes a force actuator 670. Force actuators may allow for better actuation of a sensor when an external force is applied to the area. Force actuators may come in various configurations, including force concentrators and conformable layers. In sensor 620, the force actuator 670 is configured to be a force concentrator 673. The force concentrator 673 may be used to concentrate applied force onto the sensing area. The force concentrator 673 includes a layer of flexible material but may alternately be a layer of rigid material. The force concentrator 673 is configured to be in line vertically with the sensor. The force concentrator 673 may be smaller in area than the footprint of the sensor 620, fitting within the bounds of the sensor walls established by the spacer 624. The force concentrator 673 functions by acting as a pressure point onto which applied force is directed, transferring the force directly through the force concentrator 673 to the sensor 620, rather than allowing the force to be dispersed onto non-sensing elements, such as the walls of the sensing element such as the spacer 624. The force concentrator can be placed above, below, or between the layers of a sensing element.

Figure 14:
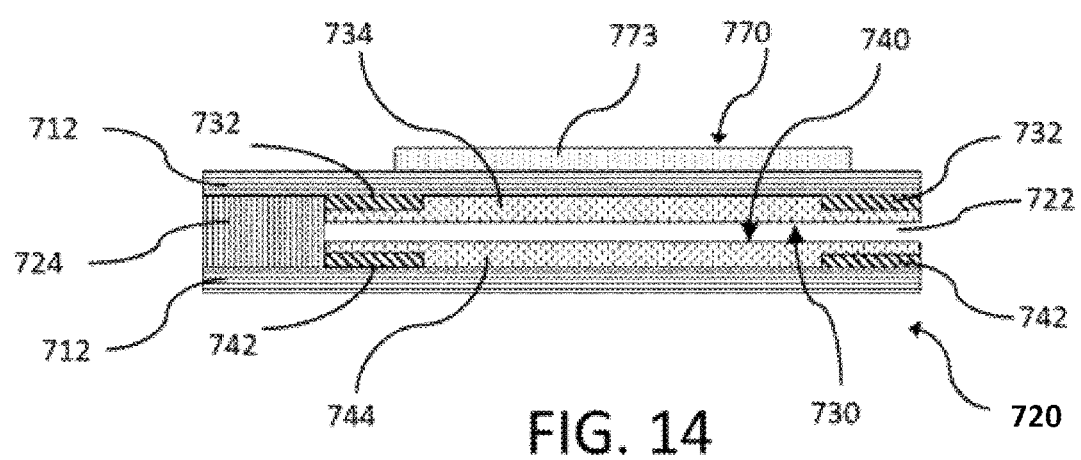
FIG. 14 is a schematic cross-sectional view of a sensor in accordance with an embodiment of the present disclosure.

FIG. 14 shows a cross sectional view of another embodiment of a sensor in accordance with the present disclosure. The sensor 720 includes a force actuator 770. The force actuator 770 is configured as a force concentrator 773 disposed above the first layer 730 overlapping the low-resistance elements 732 and 742.

Figure 15:
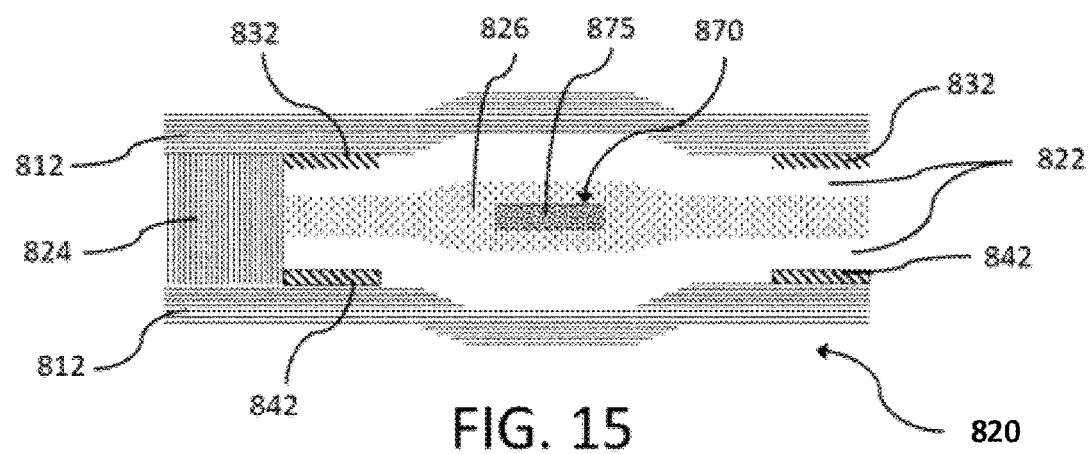
FIG. 15 is a schematic cross-sectional view of a sensor in accordance with an embodiment of the present disclosure.

FIG. 15 shows a cross sectional view of another embodiment of a sensor in accordance with the present disclosure. The sensor 820 includes a force actuator 870. The force actuator 870 is configured as a force concentrator 873 disposed in between the first layer 830 and second layer 840 within the high-resistance material 826 and within the pattern of low-resistance material 832, and 842.

Figure 16:
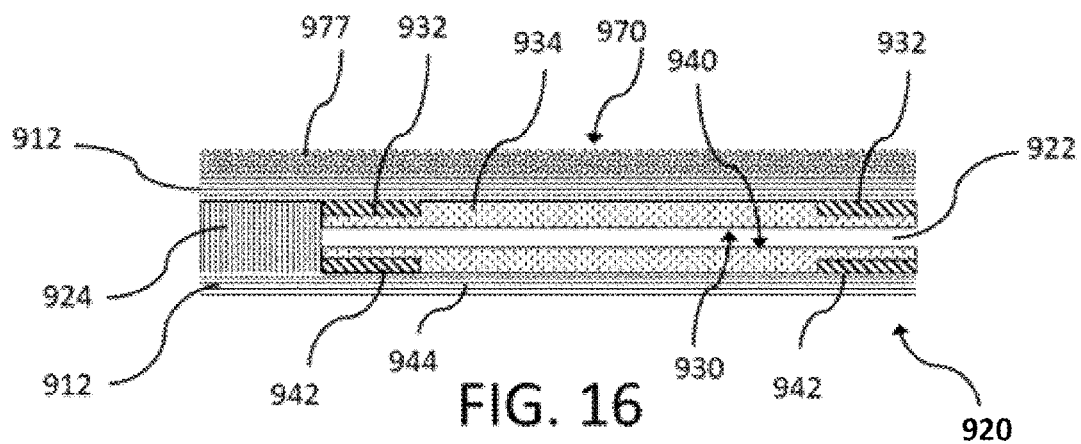
FIG. 16 is a schematic cross-sectional view of a sensor in accordance with an embodiment of the present disclosure.

FIG. 16 shows a cross sectional view of another embodiment of a sensor in accordance with the present disclosure. The sensor 920 includes a force actuator 970. The force actuator 970 is configured as a conformable layer 977 disposed above the first layer 930. The conformable layer 970 may be used to conform to the shape of the sensor, allowing for transmission of force to the sensing element. The conformable layer may sit atop of the sensor. As force is applied to the sensor and the sensing element, the base material layers 912 bend towards each other and away from the applied force. In such circumstances, the force may then be concentrated onto the walls of the sensor, the spacer 924, preventing additional force from transmitting through to the sensing element. An example of a conformable layer would be a foam layer sitting atop the sensor; however the conformable layer may be manufactured from any elastic material such as urethane, Sorbothane®.

Figure 17:
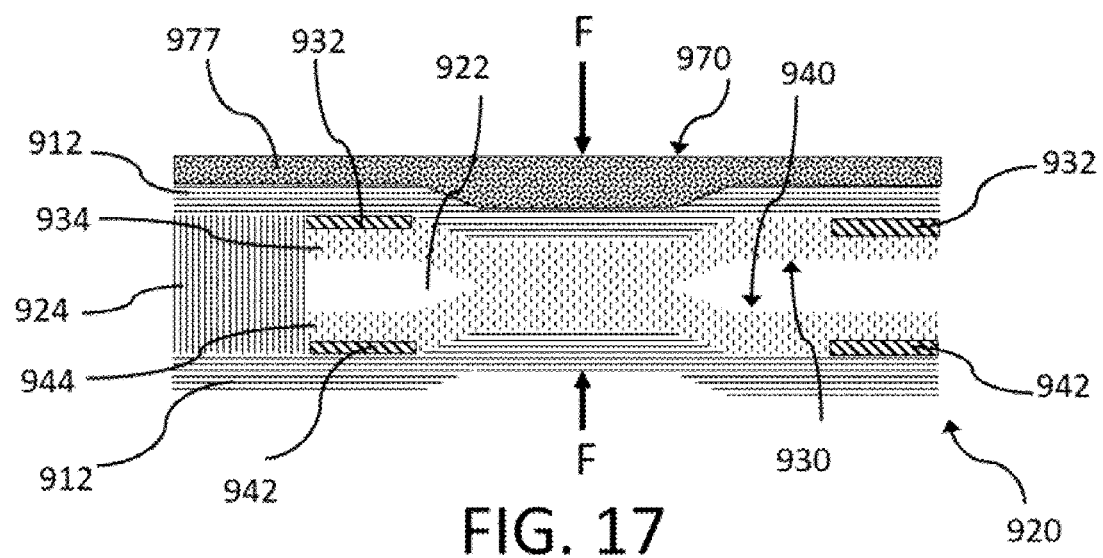
FIG. 17 is a schematic cross-sectional view of the sensor of FIG. 16 during exposure to pressure.

FIG. 17 shows a cross sectional view of the sensor of FIG. 16 with a force F applied to the sensor 920. The conformable layer 970 may work to direct the applied force through to the underlying sensing element by remaining in contact with the surface outlined by the high-resistance material throughout the deformation.

Figure 18:
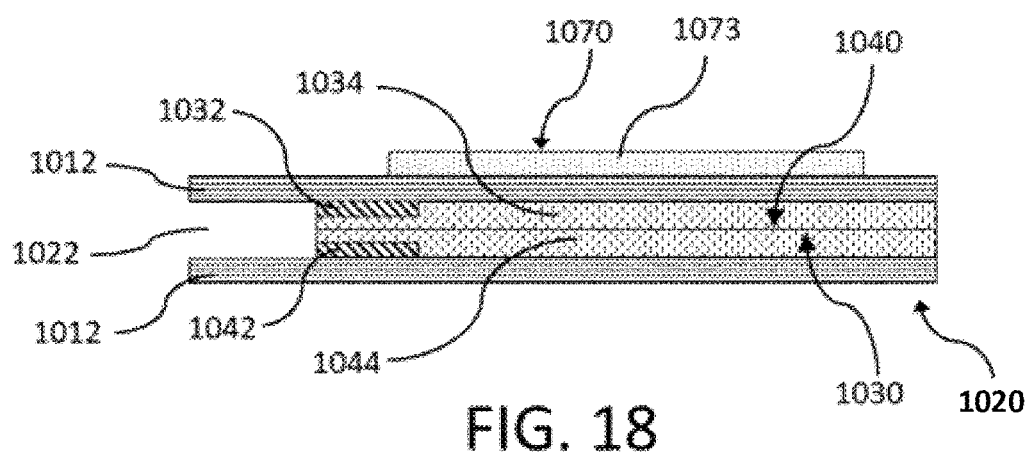
FIG. 18 is a schematic cross-sectional view of a sensor in accordance with an embodiment of the present disclosure.

FIG. 18 shows a cross section of the sensor 1020 with the first high-resistance material 1034 and the second high-resistance material 1044 in contact. Other high-resistance sensor designs inherently have an activation threshold pressure, under which the pressure cannot be measured. This activation threshold is due to the configuration of the sensor: the air gap separating the two opposing first and second low-resistance layers results in a situation where some finite amount of pressure is required to be applied to the sensor before these two opposing sensing layers will come into contact with one another through the air gap. This amount of pressure is the activation threshold. It can be minimized if the air gap distance is minimized and can be removed entirely if no air gap exists. In this latter scenario, the two opposing layers may be touching, even under a no pressure scenario. This may result in a conductive pathway, even without pressure application. Pressure application to the sensor will bring the two opposing sides into more intimate contact, increasing the amount of surface area in contact and allow for known electrical phenomena associated with force-sensing resistors to reduce the resistance between the layers. In fabrication, an insulating layer may be placed between ink layers to prevent electrical contact between layers in areas outside of the sensing element, for example, between top and bottom conducting traces. This insulating layer has a finite thickness. So, even without a dedicated spacer component separating the high-resistance material layers, there will be a finite thickness between them, establishing an air gap and resulting in a finite activation threshold.

One method to counteract this undesirable spacer thickness may be to intentionally evacuate the air between the layers, establishing a vacuum within the space between the sensing layers, and thus bringing the opposing sides into contact.

Sensors that have been evacuated of air may be used to sense tension. As the low-resistive materials of the opposing first and second layers are urged apart, a signal change resulting from the change in electrical communication between the two conductive layers may be detected.

Manufacturing of the high resistance sensors may be performed using known printing and screening techniques. Two opposing base materials may have conductive low resistance material traces placed onto them. The base materials may be made of polymer materials including polyester, polyethylene terephthalate, or other such materials. The low resistance material conductive traces may be silver, copper, gold, carbon black ink, or any other conductive material. The conductive traces may be placed onto the base material by printing, screening, lithography, photolithography, or any other form of attaching conductive material to a base. Force-sensing resistive material (FSR) is then placed onto the base substrate and conductive trace layer. The FSR may be in direct contact with the base substrate, the conductive layer, or both. The FSR is placed using known placement techniques, which may include printing, screening, spraying, lithography, photolithography, or other placement methods. A dielectric material may be placed atop the conductive layer and base substrate layer.

The two opposing layers may then be placed into contact with one another, with the FSR and conductive layer facing one another. The opposing layers may be placed into contact by an adhesive layer. The adhesive layer may act as a spacer between the two layers, establishing an air gap between the two layers. The FSR and adhesive layers may be patterned such that no adhesive layer exists between patterned FSR sections, establishing force sensing areas where the FSR from opposing layers may come into contact under applied force or pressure. The adhesive may be applied in a sparse pattern such that few adhesive anchors are used to adhere opposing layers to one another, allowing for opposing layers to come into contact under a no-pressure scenario where no adhesive is. A dedicated spacer layer may be placed between the two opposing layers, adhered to the two opposing layers with adhesive.

The two opposing layers may be connected without adhesive, using other known techniques including ultrasonic welding, heat-staking, contact welding, or other methods. These methods may allow for contact without the need for an intermediary layer such as an adhesive between opposing layers, preventing the establishment of an air gap, and allowing for contact between FSR layers in a no-pressure scenario. In the preceding description, for purposes of explanation, numerous details are set forth in order to provide a thorough understanding of the embodiments. However, it will be apparent to one skilled in the art that these specific details are not required.

The above-described embodiments are intended to be examples only. Alterations, modifications and variations can be effected to the particular embodiments by those of skill in the art without departing from the scope, which is defined solely by the claims appended hereto.

We claim:

1. An insole-based sensor system comprising:
   at least one sensorized insole, wherein the at least one sensorized insole comprises:
   a first base material in the shape of a foot outline;
   a second base material in the shape of the foot outline;
   a plurality of sensors disposed between the first base material and the second base material, configured to produce at least one output, wherein each sensor comprises:
   a first low-resistance material connected with the first base material;
   a second low-resistance material connected with the second base material and separated from the first low-resistance material by a gap for flexing toward the first low-resistance material under a stimulus; and
   a first high-resistance material positioned within the gap intermediate the first low-resistance material and the second low-resistance material for increasing the resistance of a circuit formed between the first low-resistance material and the second low-resistance material when the sensor is subjected to the stimulus;
   a plurality of traces comprising a plurality of first traces arranged in a first orientation and a plurality of second traces arranged in a second orientation, configured to electrically transmit the at least one output to an output interface, wherein each sensor in the plurality of sensors is electrically connected to the output interface by a pair of traces comprising a first trace and a second trace, wherein the first trace is connected to the first low-resistance material and the second trace is connected to the second low-resistance material.

2. The insole-based sensor system of claim 1, wherein each sensor further comprises a second high resistance-material in constant contact with the first high-resistance material, and the circuit is formed by bringing the first high-resistance material and the second high-resistance material into more intimate contact.

3. The insole-based sensor system of claim 1, wherein:
   the stimulus is a force; and
   the at least one sensorized insole further comprises a force actuator configured as a conformable layer disposed above the first base material, wherein the conformable layer conforms to a shape of each sensor and allows for transmission of the force to each sensor and the conformable layer directs the force through to each sensor by remaining in contact with a surface outlined by the first high-resistance material of each sensor throughout deformation.

4. The insole-based sensor system of claim 1, wherein the first orientation is one of a row arrangement or a column arrangement, and the second orientation is the other of the row arrangement or the column arrangement.

5. The insole-based sensor system of claim 1, further comprising:
   a transmission device in communication with the output interface for receiving the at least one output and transmitting the at least one output to a computing device; and
   the computing device for receiving the at least one output and processing the at least one output to create at least one processed output.

6. The insole-based sensor system of claim 5, further comprising a communication module for communicating the at least one processed output to a user and/or a storage module for storing the at least one processed output.

7. The insole-based sensor system of claim 1, wherein the at least one sensorized insole further comprises a power source for supplying power to the plurality of sensors, wherein the power source is a battery.

8. The insole-based sensor system of claim 1, wherein the gap of each sensor in the plurality of sensors is open to the atmosphere.

9. The insole-based sensor system of claim 1, wherein the gap of each sensor in the plurality of sensors is vacuum sealed.

10. The insole-based sensor system of claim 1, further comprising a protective material for reducing permeation of fluids into the plurality of sensors.

11. The insole-based sensor system of claim 1, further comprising an adhesive spacer for establishing the gap of each sensor in the plurality of sensors.

12. The insole-based sensor system of claim 1, further comprising one or more dielectric material layers between the first base material and the second base material.

13. A method of sensing a stimulus comprising:
   providing a plurality of sensors disposed within the at least one sensorized insole, each sensor comprising:
   a first low-resistance material separated from a second low-resistance material by a gap;
   a first high-resistance material intermediate the first low-resistance material and the second low-resistance material within the gap;
   applying a stimulus to the first low-resistance material and the second low-resistance material of each sensor for closing the gap between the first low-resistance material and the second low-resistance material to create a circuit including the first low-resistance material, the second low-resistance material, and the first high-resistance material, wherein the stimulus is directed to the first low-resistance material and the second low-resistance material by a first base material in the shape of a foot outline connected with the first low-resistance material and a second base material in the shape of the foot outline connected with the second low-resistance material;
   measuring at least one output of the circuit as a result of the stimulus, wherein the at least one output is a change in electrical properties of the circuit;
   electrically transmitting the at least one output of the circuit through a first trace connected to the first low-resistance material or a second trace connected to the second low-resistance material, to an output interface.

14. The method of claim 13, wherein each sensor further comprises a second high-resistance material in constant contact with the first high-resistance material, and wherein the circuit is formed by bringing the first high-resistance material and the second high-resistance material into more intimate contact.

15. The method of claim 13, wherein:
   the stimulus is a force; and
   the force is directed to the first low-resistance material and the second low-resistance material of each sensor by a force actuator in the form of a conformable layer disposed above the first base material, wherein the conformable layer conforms to a shape of each sensor and allows for transmission of the force to each sensor, wherein the conformable layer directs the force through to each sensor by remaining in contact with a surface outlined by the first high-resistance material of each sensor throughout deformation.

16. The method of claim 13, wherein the at least one sensorized insole comprises a plurality of first traces, including the first trace, arranged in a first orientation and a plurality of second traces, including the second trace, arranged in a second orientation, wherein the first orientation is one of a row arrangement or a column arrangement, and the second orientation is the other of the row arrangement or the column arrangement.

17. The method of claim 13, further comprising:
transmitting the at least one output from the output interface to a computing device via a transmitting device; and
processing the at least one output at the computing device to create at least one processed output.

18. The method of claim 17, further comprising communicating the at least one processed output to a user via a communication module and/or storing the at least one processed output on a storage module.

19. The method of claim 13, further comprising providing power to the plurality of sensors using a power source, wherein the power source is a battery.

20. The method of claim 13, further comprising providing a protective material for reducing permeation of fluids into the plurality of sensors.

* * * * *